United States Patent [19]

Beckmann

[11] 4,155,007

[45] May 15, 1979

[54] RADIATION SCANNING AND DETECTION SYSTEM

[75] Inventor: Leo H. J. F. Beckmann, Delft, Netherlands

[73] Assignee: N.V. Optische Industrie "De Oude Delft", Netherlands

[21] Appl. No.: 807,150

[22] Filed: Jun. 16, 1977

[30] Foreign Application Priority Data

Jun. 24, 1976 [NL] Netherlands ..................... 7606899

[51] Int. Cl.$^2$ .................... G01V 5/00; G01J 1/00; G01J 1/42
[52] U.S. Cl. .................................... 250/253; 250/342; 250/347; 250/349
[58] Field of Search ............... 250/253, 332, 334, 336, 250/342, 349, 350, 394

[56] References Cited

U.S. PATENT DOCUMENTS

| 3,191,035 | 6/1965 | Brumfield et al. ............ 250/342 |
| 3,781,558 | 12/1973 | Anderson ..................... 250/332 |
| 3,889,117 | 6/1975 | Shaw, Jr. ..................... 250/332 |

Primary Examiner—Alfred E. Smith
Assistant Examiner—Janice A. Howell
Attorney, Agent, or Firm—O'Brien and Marks

[57] ABSTRACT

A radiation scanning-detecting and processing system having a composite detector arrangement including detector elements having mutually different sensitive areas. An information processing system coupled to such detector arrangement is effective in response to certain operational parameters to selectively vary the relative contributions of detector elements having different sensitive areas to the overall signal derived from all detector elements in combination.

11 Claims, 9 Drawing Figures

RADIATION SCANNING AND DETECTION SYSTEM

BACKGROUND OF THE INVENTION

This invention relates to a radiation scanning and detecting system.

One prior art system of this kind, for instance as described and claimed in U.S. Pat. No. 3,448,267, filed on Oct. 27, 1965, by Richard Blythe et al, N. Harbour, Mich., assignors to the Bendix Corporation, a corporation of Delaware, and entitled "Apparatus for infra-red scanning having a variable detector aperture and a variable bandwidth amplifier", comprises a radiation detector which is responsive to radiation from a projected ground image of the detector as focused by an optical system. The projected ground image is scanned across the terrain by means of an optical scanner, while an amplified detector output is recorded. To improve the performance of this system in providing a radiation strip map from the recorded and processed data, either the effective sensing area of the detector comprising a single detector element, or the electrical bandwidth of the system, or both are varied automatically as a function of an average ambient radiation level. To this end a variable spatial filter is disposed along the optical path between the optical system and the detector. This spatial filter comprises a fixed optical stop member and a movable stop member that in response to a control signal applied thereto controls the size of an aperture and therefore functions as a diaphragm which controls the effective size of the detector sensing area. This arrangement is bound to a certain physical distance between the detector and the diaphragm. Consequently, this diaphragm will not be solely effective as a "field" diaphragm, but will also cause half-shadow effects to occur; in other words, due to the physical distance a certain amount of available radiation from the ground will be blocked from reaching the detector, so that less useful radiation will be incident upon the detector area. Therefore an increase of resolution achieved by a decrease of the aperture size of the diaphragm is bought at the cost of a decrease in useful radiation incident upon the detector sensing area. Consequently, the signal-to-noise ratio will be decreased when the resolution is increased. According to this known system, an increase of the resolution, caused when the incoming radiation level is relatively high, is accompanied by a corresponding increase of the system bandwidth to be compatible with the size of the resolution cell projected on the ground and to pass high frequency components incident to the higher resolution; due to this increased bandwidth the signal-to-noise ratio is further degraded. Furthermore, due to the electro-mechanical nature of the spatial filter the response to radiation level variations is limited.

U.S. Pat. No. 3,723,642, entitled "A thermal display system", relates to a radiation scanning and detecting system wherein the scanned signals are processed in a certain manner. Such a system comprises a linear array of equally sized detector elements. An optical scanner is provided for scanning a field of an image in accordance with a two-dimensional frame; an optical system produces a stationary beam from the scanner output, which beam is directed to the focal plane of the detector array. The individual video signals produced by each of the detector elements of the array during each line scan, are each representative of the same line being scanned. By appropriately processing, more in particular delaying the individual video signals derived from the detector elements, and then adding the signals thus delayed, the system performance, more in particular the signal-to-noise ratio, can be improved in a relatively simple and reliable manner.

However, the characteristics of the ultimately reproduced and/or recorded output signal representing the scanned field of image, cannot be varied and/or adapted to variable parameters in which the vehicle carrying the radiation scanning and detecting system is to operate, because such characteristics basically are determined by the fixed configuration of the detector elements. Only by varying the number and/or physical configuration of the detector elements such characteristics can be varied.

SUMMARY OF THE INVENTION

It is a main object of the present invention to improve the performance of a radiation scanning and detecting system of the above-described kind.

In general, the performance of a radiation scanning and detecting system depends on parameters indicative of certain operational conditions under which the system is to operate.

More specifically, it is an object of the present invention to automatically optimize the performance of a radiation scanning and detecting system in dependence upon certain operational parameters.

A radiation scanning and processing system, wherein radiation from a source is scanned and then converted to an output signal which varies in accordance with variations in radiation level, comprises an array of individual detector elements with well-defined sensitive areas, this array including detector elements of different sensitive areas, an information processing arrangement having included therein means responsive to one or more operational parameters for varying the relative contributions made by detector elements having different sensitive areas to the output signal in accordance with predetermined functions of such parameters.

A radiation detecting and scanning system according to the invention can be advantageously employed in a system for making a photographic film recording of an image of a terrain observed from an airborne vehicle. Such a recording system comprises an optical scanner which is arranged to scan radiation from the ground in lines transverse to the flight direction of the vehicle. In such an application important operational parameters are the ratio v/h, wherein v represents the forward speed of the vehicle and h represents the altitude thereof, and the signal-to-noise ratio of the signal as delivered by the optical scanner. When such a system is arranged for the detection of infrared radiation emitted from the ground and objects thereon there are two factors, i.e. the geometrical resolution and the thermal resolution, which are substantially determinative of the quality of the ultimately photographically recorded image. The geometrical resolution depends on the scanning beam associated with a detector element, more in particular the angular width of such a beam, while the thermal resolution depends on the signal-to-noise ratio of the output from the radiation detectors and is often expressed as the temperature difference which creates a signal canal to the noise and called the noise equivalent temperature difference $\Delta T_n$. In order to achieve an optimal compromise between the two afore-mentioned quantities (angular width of the beam and noise equivalent temperature difference) over a broad range of v/h values, for instance from 0.6 to 4 rad s$^{-1}$, an illustrative embodiment of the invention has the information processing arrangement organized in such a manner that the relative contribution to the output signal as made by detector elements having a sensitive area larger than that of other detector elements is increased and decreased respectively in proportion to a increase and decrease respectively of the operational parameter v/h, wherein v represents the speed and h the altitude of the airborne vehicle.

It is a further advantage to have the facility to make the relative contribution of detector elements having a sensitive area larger than that of other detector elements, dependent upon the signal-to-noise ratio as determined by detector elements having a relatively small sensitive area. The detector elements having a relative large sensitive area are initially employed to improve the signal-to-noise ratio when the quantity v/h is relatively large, for instance in the range of 0.6 to 4 rad s$^{-1}$, which means that the altitude is relatively small. In such a situation it may happen (for instance in dependence upon the type of weather condition) that the video signal representative of the terrain under observation is presented with so high a signal-to-noise ratio that the contribution of the detector elements having a relatively large sensitive area is more or less superfluous at the given v/h-value. In other words, in such a situation it is feasible to decrease the relative contribution of the detector elements having a relatively large sensitive area, to thereby increase the geometrical resolution. In view of the facility outlined above, in a further illustrative embodiment of the invention the information processing arrangement is further organized to decrease and increase respectively the relative contribution to the output signal as made by detector elements having a sensitive area larger than that of other detector elements, when the signal-to-noise ratio of the presented video signal is greater and smaller respectively. In other words, in a range of relatively large v/h-values, it is for instance feasible to achieve a compromise which is matched to, for instance, the weather conditions, so that due to a redundancy of thermal resolution the geometrical resolution can be increased.

BRIEF DESCRIPTION OF THE DRAWINGS

To illustrate the invention, a preferred embodiment of this invention will be described hereinafter with reference to the accompanying drawings. This preferred embodiment concerns an opto-electric radiation scanning and detecting system responsive to infrared radiation and adapted for use in a system for making a photographic film recording of an image of a terrain scanned from an aircraft flying over this terrain. In the drawings.

FIG. 5b shows a preferred embodiment of the system of FIG. 5a;

DETAILED DESCRIPTION OF THE DRAWINGS

Figure 1:
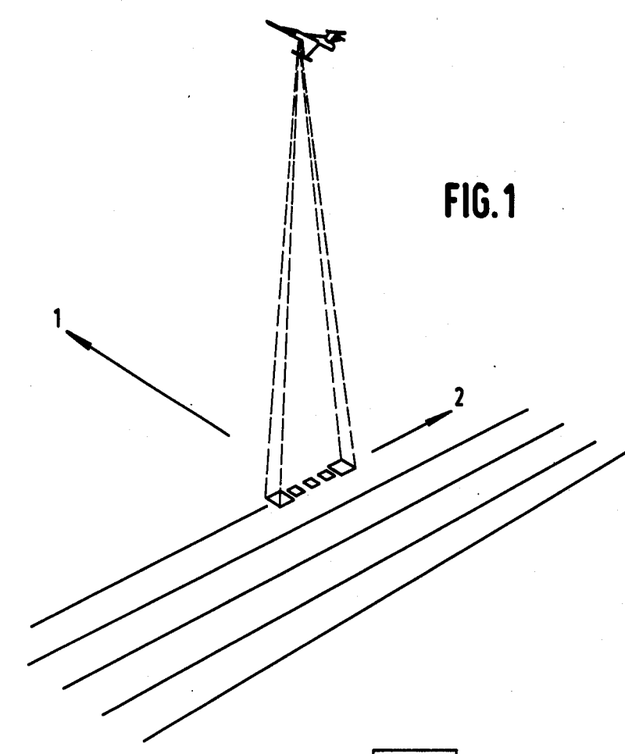
FIG. 1 shows a general view of the situation in which an aircraft carrying a system for making a photographic film recording of an image and having incorporated therein an opto-electric radiation scanning and detecting system according to the invention, flies over a terrain in the direction indicated by arrow 1.

FIG. 1 shows a general view of the situation in which an aircraft carrying a system for making a photographic film recording of an image and having incorporated therein an opto-electric radiation scanning and detecting system according to the invention, flies over a terrain in the direction indicated by arrow 1. In the embodiment under consideration, use is made of a configuration of five detector elements arranged in a row extending in the scan direction indicated by arrow 2. Though this embodiment employs only one row of detector elements, the invention is not limited thereto and, if desired, a plurality of rows of detector elements may be used. In the present embodiment, this row includes three elements having a relatively small sensitive area and two elements having a relatively large sensitive area, the three elements having a relatively small sensitive area being operative for all v/h ratios. In FIG. 1, this configuration of detector elements is projected on the ground, the portion of the ground defined by the broken lines being displayed on the detector elements in the aircraft during one scan sweep. Thus the image of the terrain as presented thereby is scanned line by line. The detector elements having a relatively large sensitive area are rendered operative at higher v/h values, for example 0.6 rad s$^{-1}$. As will be explained lateron, by means of such a combination of detector elements having different sensitive areas it is possible to achieve an optimal compromise between the geometrical resolution and the thermal resolution throughout the entire range of v/h values. It is observed in this connection that, from the nature of the line-by-line scanning of the terrain as employed in the present embodiment, the geometrical resolution in the case of relatively high altitude, i.e. low value of v/h, is essentially determined by the width of the scanning beam, whereas in the case of relatively low altitude, i.e. relatively high v/h values, this geometrical resolution essential depends on the scane rate in relation to the speed of the aircraft. For relatively high v/h values, a wider scanning beam width may be employed adapted to the distance of the lines scanned, which results in a corresponding enhancement of the signal-to-noise ratio. Such an adaptation of the scanning beam width to the operational parameter v/h is possible by employing detector elements of different sizes or different sensitive areas. In the operational condition, in the case of low values of v/h only the smallest detector elements will be operative, so that the operational scanning beam width is small, whereas in the case of relatively high values of v/h the contributions of the larger detector elements are added, which results in an increase in the operational scanning beam width and hence in a corresponding increase in the signal-to-noise ratio.

Figure 2:
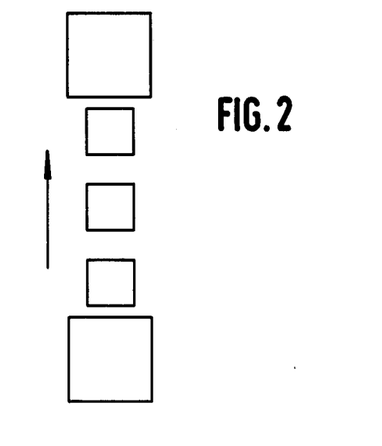
FIG. 2 shows an array of detector elements employed in an embodiment of an opto-electric radiation scanning and detecting system according to the invention.

FIG. 2 shows in greater detail a configuration of detector elements that may be used to advantage in an opto-electric radiation scanning and detecting system according to the present invention. In this FIG. 2, the arrow indicates the scan direction.

It is observed in this respect that the signal-to-noise ratio of the system is largely determined by the angular width of the scanning beam, so that in practice a limitation is placed on the decrease of the operative angular width of the scanning beam. This limitation can be favourably shifted by using a detector element configuration in which a plurality of elements is serially operative, as schematically shown in FIG. 2. The configuration shown in FIG. 2 includes three detector elements for forming a scanning beam of 1.0 mrad and two detector elements for forming a scanning beam of 1.7 mrad. By means of this configuration, scan sweeps in a direction normal to the direction of flight, as schematically shown in FIG. 1, result in a scanning of parallel image lines, which in the event of 12 scan lines per revolution and a rotor speed of the optical scanner of 11200 revolutions per minute boils down to a scan rate of 2240 image lines per second. The scanner is operative so that each time the same information-containing light radiation is received by the detector elements of the configuration one after another. In other words, signals from different detector elements are identical to one another and are only time-shifted relative to one another. Preferably, the detector elements having a small sensitive area are disposed more to the centre of the configuration inbetween the detector elements having a large sensitive area, as such a configuration of detector elements provides maximum resolution in the centre of the optical field. However, the invention is not limited to the configuration shown in FIG. 2. For example, a larger number of detector elements of large sensitive area may be used, in which case it is possible, moreover, to dispose a plurality of such detector elements of large sensitive area in adjoining relationship.

Figure 3:
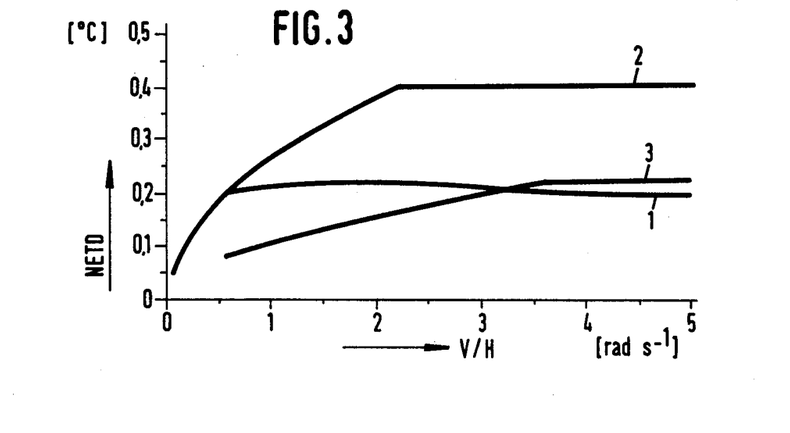
FIG. 3 shows a graphic representation of the thermal resolution as a function of the v/h ratio.

FIG. 3 shows a graphic representation of the thermal resolution as a function of the v/h ratio as can be realized in the present embodiment of the invention. This figure shows that, at small values of v/h, the scan lines derived from detector elements having a sensitive area associated with a scanning beam angle of 1.0 mrad are overlapping, in which case as a result of the signal integrating effect produced by the recording film, an operative noise equivalent temperature difference (NETD) can be achieved that is better than 0.1° C. for v/h <0.2 rad s$^{-1}$. At a v/h value of 0.6 rad s$^{-1}$ the overlapping of adjacent image lines is reduced so that a NETD value of approximately 0.2° C. is obtained.

This value of the thermal resolution can approximately be maintained throughout the further range of higher v/h values by adding the signal contribution made by the detector elements of relatively large sensitive area from this v/h value of approx. 0.6 rad s$^{-1}$ and to cause this relative contribution to increase in essentially linear fashion from 0% to 65% over a range of v/h values of 0.6 to approx. 4 rad s$^{-1}$.

Figure 4A:
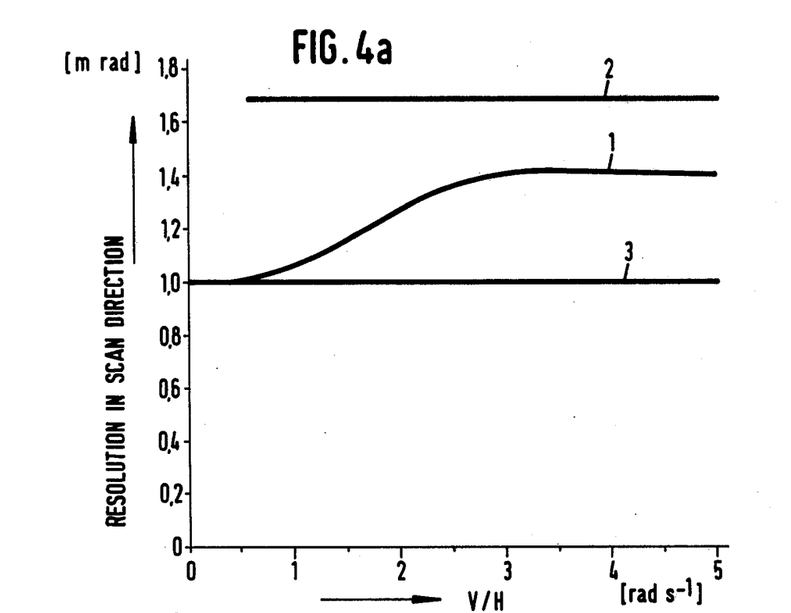
FIG. 4a shows the relative contributions of detector elements having different sensitive areas and the scanning beam angle in the scan direction as a function of the v/h ratio.

Over the same range of v/h values, the operative angular width of the scanning beam in the scanner gradually increases from 1.0 mrad to 1.4 mrad, as shown in FIG. 4a, curve 1. In FIG. 4a the contribution of the detector elements having relatively large sensitive area is represented by line 2, while the contribution of the detector elements having small sensitive area is represented by line 3.

Figure 4B:
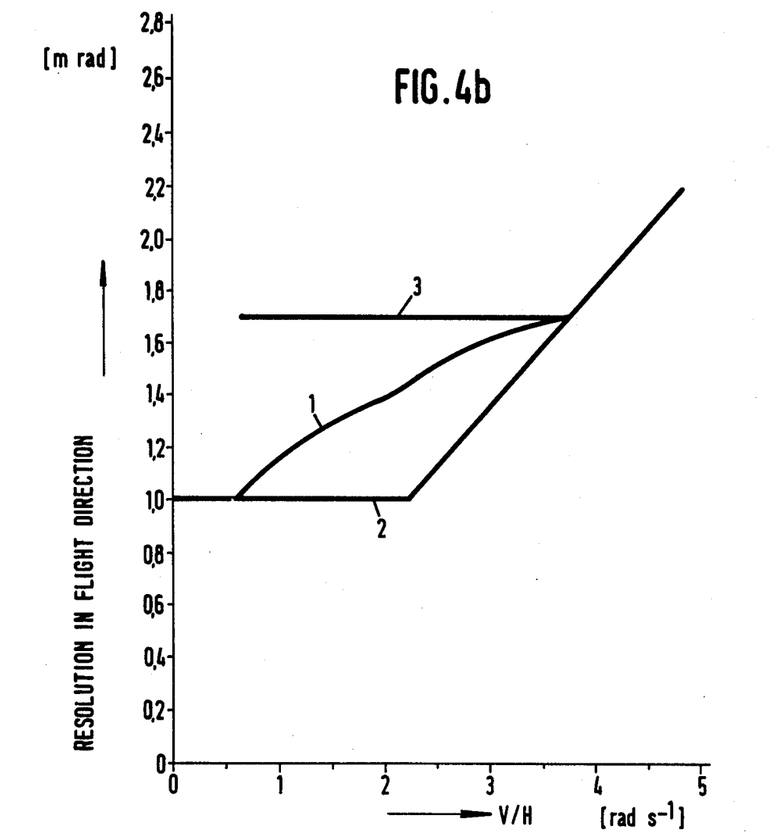
FIG. 4b shows the relative contributions of detector elements having different sensitive areas and the combined resolution in the flight direction as a function of the v/h ratio.

In FIG. 3, line 2 represents the contribution of the noise equivalent temperature difference as made by the detector elements having relatively small sensitive area, while line 3 represents the contribution to this noise equivalent temperature difference as made by the detector elements having relatively large sensitive area. Line 1 in this FIG. 3 is indicative of the combined noise equivalent temperature difference. In the flight direction of the aircraft the geometrical resolution is limited, in principle, by the scanning beam for all v/h values smaller than or equal to 3.2 rad s$^{-1}$; for higher v/h values, this geometrical resolution is limited by the scan rate. (See FIG. 4b, in which line 1 represents the combined resolution, line 2 represents the contribution of the detector elements of small sensitive area and line 3 represents the contribution of the detector elements of large sensitive area.)

When the image of the terrain flown over by the aircraft is a high-contrast one, it is advantageous to cause the signal contribution made by the detector elements of relatively large sensitive area to commence at a value higher than the aforesaid 0.6 rad s$^{-1}$, for example, at 1.6 rad s$^{-1}$, in which case this contribution reaches its maximum at a v/h value of approx. 4.8 rad s$^{-1}$. In other words, in a situation in which such a high-contrast image is presented, a higher geometrical resolution can be used.

Figure 5A:
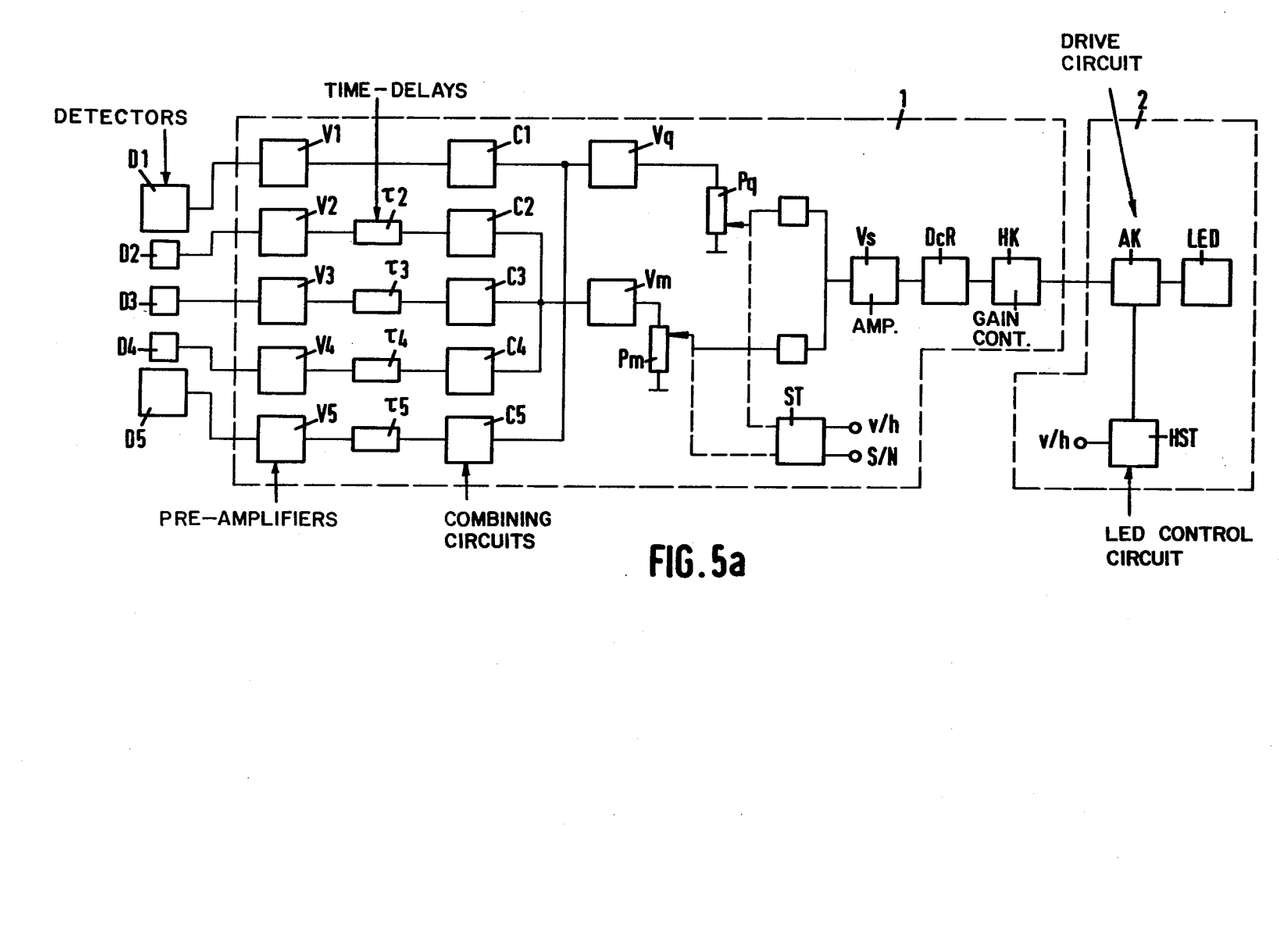
FIG. 5a shows a block diagram of a general embodiment of an opto-electric scanning-detecting and processing system according to the invention.

FIG. 5a shows a block diagram of the present embodiment of an opto-electric radiation scanning and detecting system according to the present application. This system employs a configuration of five detector elements, as described above, which elements are designated in FIG. 5a by D1-D5. Each of these detector elements is connected through a separate conductor to an electric processing arrangement (block 1 as indicated by the broken lines). The output of this processing arrangement is connected to an output device (block 2 as indicated by the broken lines) adapted to convert the output signals of the processing arrangement to light radiation suited for recording on photographic film and containing the information provided by the detector elements. Each one of the detector elements D1-D5 is associated with a preamplifier V1-V5. By means of these preamplifiers, the bias level suited for the respective detector element is adjusted and stabilized, and the respective electric signal derived from the associated detector element is given a level suited for further signal processing. The output signals from these preamplifiers are, after having appropriate delays introduced thereinto by delay means $\tau 2$-$\tau 5$, as will be explained lateron, combined in the manner shown by combining circuits C1-C5 into two composite video signals that are to be further processed, each composite video signal being passed through a separate amplifier Vq, Vm. The output signals of amplifiers Vq and Vm are added to each other in accordance with predetermined functions, for example the functions shown in FIG. 7, which leads to the ultimate video signal that, after further processing, is used for forming an image of the terrain by means of output device 2. Though falling outside the scope of the present invention, for the sake of completeness it is observed that the further processing of these composite video signals involves DC-level restoration, compression of the dynamic signal range and, if desired, compensation for a rolling movement of the aircraft.

In output device 2 the ultimate electric output signal is applied to a high-intensity light-emitting diode LED, which diode converts the electric signals applied thereto to light radiation containing information corresponding with that contained in the electric signals, which light radiation can be recorded on photographic film. The invention is not limited to the use of such an output device. Any output device, such as a magnetic recording device, that is capable of converting the electric output signal of the processing arrangement to a signal of corresponding information contents may be used.

The detector elements, such as the D1, D2, D3, D4 and D5, which each time serially scan a common image line of the terrain, yield the same information per scan sweep, except for the fact that the information fragments are shifted in time relative to one another. This time difference $\delta t$ between two successive detector elements is indicated by the formula $\delta t = (\alpha + \delta/r)$, in which $\alpha$ represents the angular width of the respective scanning beam, $\delta$ represents the angular width of the interspace between individual scanning beams, and r represents the angular speed of the scan sweep. To eliminate these time differences, the respective electric signals are delayed by means of delay mmeans $\tau 2-\tau 5$. When, as in the present embodiment, five detector elements are used having equal centre distances, the respective delays are $\tau 2 = \delta t$; $\tau 3 = 2\delta t$; $\tau 4 = 3\delta t$ and $\tau 5 = 4\delta t$.

Figure 6:
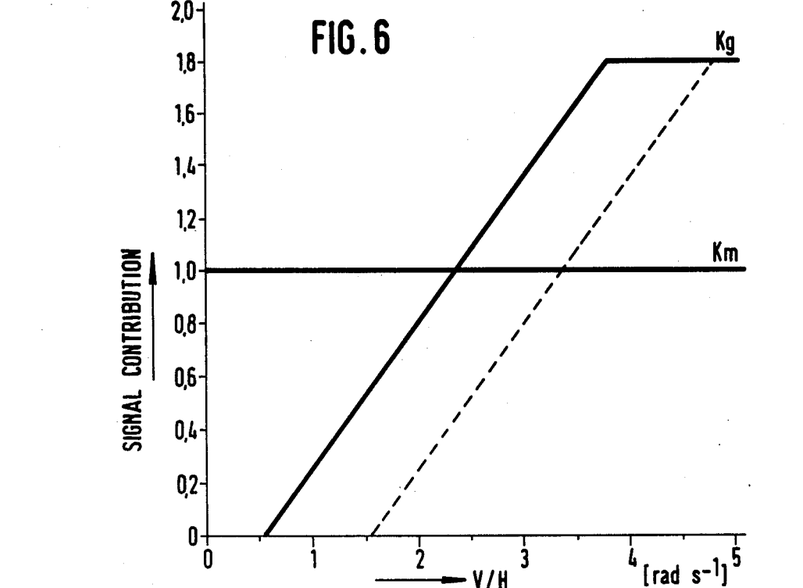
FIG. 6 shows a representation of the relative contributions of detector elements having different sensitive areas as a function of the operational parameter v/h.
Figure 7:
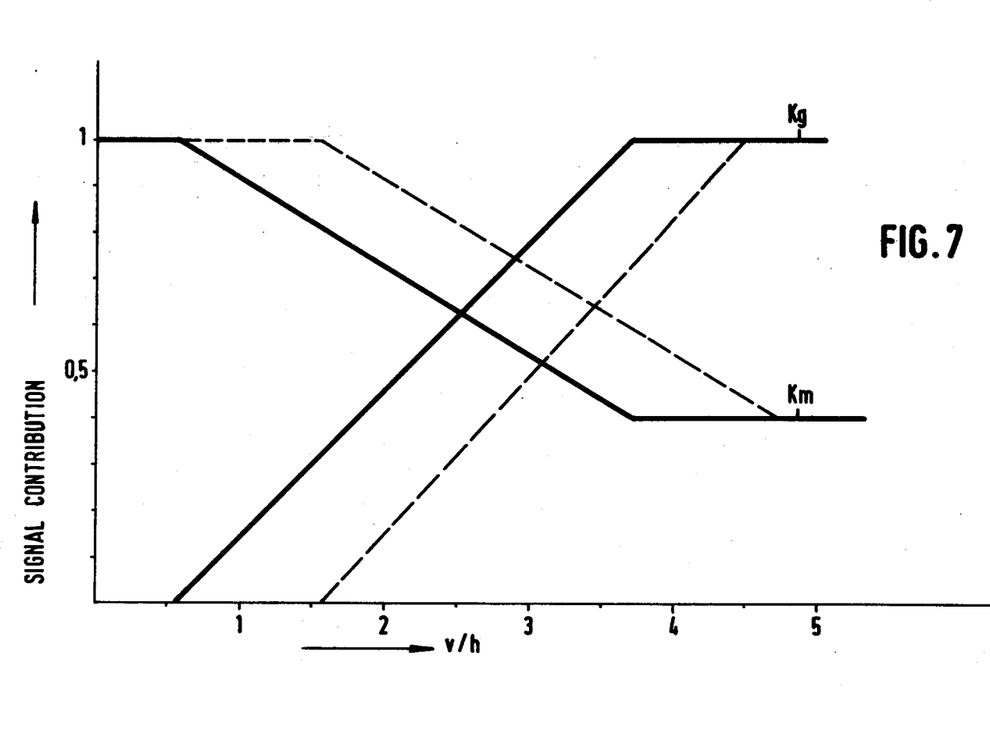
FIG. 7 shows a graphic representation of the interrelated adjustments of potentiometers Pq and Pm in the embodiment shown in FIG. 5a as a function of the operational parameter v/h.

As schematically shown, the electric output signals derived from the detector elements having relatively small sensitive area are combined with one another and applied to an associated amplifier Vm, while the electric signals derived from the detector elements having relatively large sensitive area are combined and applied to an associated amplifier Vq. The output signals of these amplifiers, after being weighted in dependence upon the operational parameter v/h and the average signal level, are added to each other to form a composite video signal. The contribution to the composite video signal as made by the small area detector elements being represented by Km and the contribution to the composite video signal as made by the large area detector elements being represented by Kq, FIG. 6 shows by way of example the ratio between these contributions Km and Kq to the composite video signal as a function of the operational parameter v/h. Such a ratio between the respective contributions as a function of the operational parameter v/h can be realized by including control means, such as for example potentiometers Pq and Pm, in the output circuit of the respective amplifiers Vq and Vm, and to control the condition of the respective potentiometer by means of a control circuit ST in dependence upon v/h as schematically shown in FIG. 7. These contributions Km and Kq are preferably selected so that, as illustrated in FIG. 3, the noise equivalent temperature difference applying to the composite signal remains essentially constant from a relatively low v/h value as a function of v/h.

As stated earlier, in the event of a high-contrast image of the terrain, i.e. a favourable signal-to-noise ratio of the presented signal, it is advantageous to reduce the contribution of the large area detector elements in order to thus achieve a certain enhancement of the geometrical resolution. This is shown in FIGS. 6 and 7 by the broken lines, indicating that the aforesaid control means may be controlled also in dependence upon the signal-to-noise ratio. These two control functions can be realized by the control circuit ST, which may include a computer programmed in accordance with the preceding, processed functions of v/h and the signal-to-noise ratio S/N so that at a given parameter value of v/h and, if necessary, the signal-to-noise ratio, an adjustment of the control means is realized that corresponds with FIG. 7. After being amplified by an associated amplifier, such as Vs, the composite video signal is passed through a DC-level restoring circuit DcR. Such a restoring circuit serves to develop a reference level suited for the recording process. A non-linear amplitude-responsive gain control and, if desired, a compensation for a rolling movement can be realized by means of auxiliary circuit HK connected to the output of the associated restoring circuit.

The thus-processed electric signals are finally applied through an associated drive circuit AK to a light-emitting diode LED adapted to convert the electric signals applied thereto to corresponding light radiation suited for recording on photographic film. The average intensity of the light-emitting diode can be controlled so that the ultimate film recording has optimal uniformity. By regulating the degree of overlap of recorded image lines, the signal-to-noise ratio of the recording can be enhanced. The drive circuit AK serves to produce the electric signals for actuating the light-emitting diode, this drive signal being a function of the film speed which in its turn is related to the operational parameter v/h. At a relatively low film speed, e.g. 8 mm s$^{-1}$, the average intensity will be low as recording on the film is effected with a great number of recording lines in overlapping relationship. At higher values of v/h, however, recording will take place with the recording lines in adjoining relationship, each line being recorded at the full intensity. The control of the light-emitting diode may be realized by means of an auxiliary control circuit HST, by means whereof the drive circuit AK can be controlled in dependence upon the forward speed of the film or the operational parameter v/h in the manner indicated above.

In the above-described embodiment of FIG. 5a the control means for varying the relative contribution of the electric video signals derived from the detector elements having large sensitive area (such as D1 and D5) and from the detector elements having small sensitive area (such as D2, D3, D4) respectively, are shown to comprise potentiometers Pq and Pm respectively in order to clearly illustrate the principle of the parameter dependent weighting process involved in the adding operations of the respective video signals.

Figure 5B:
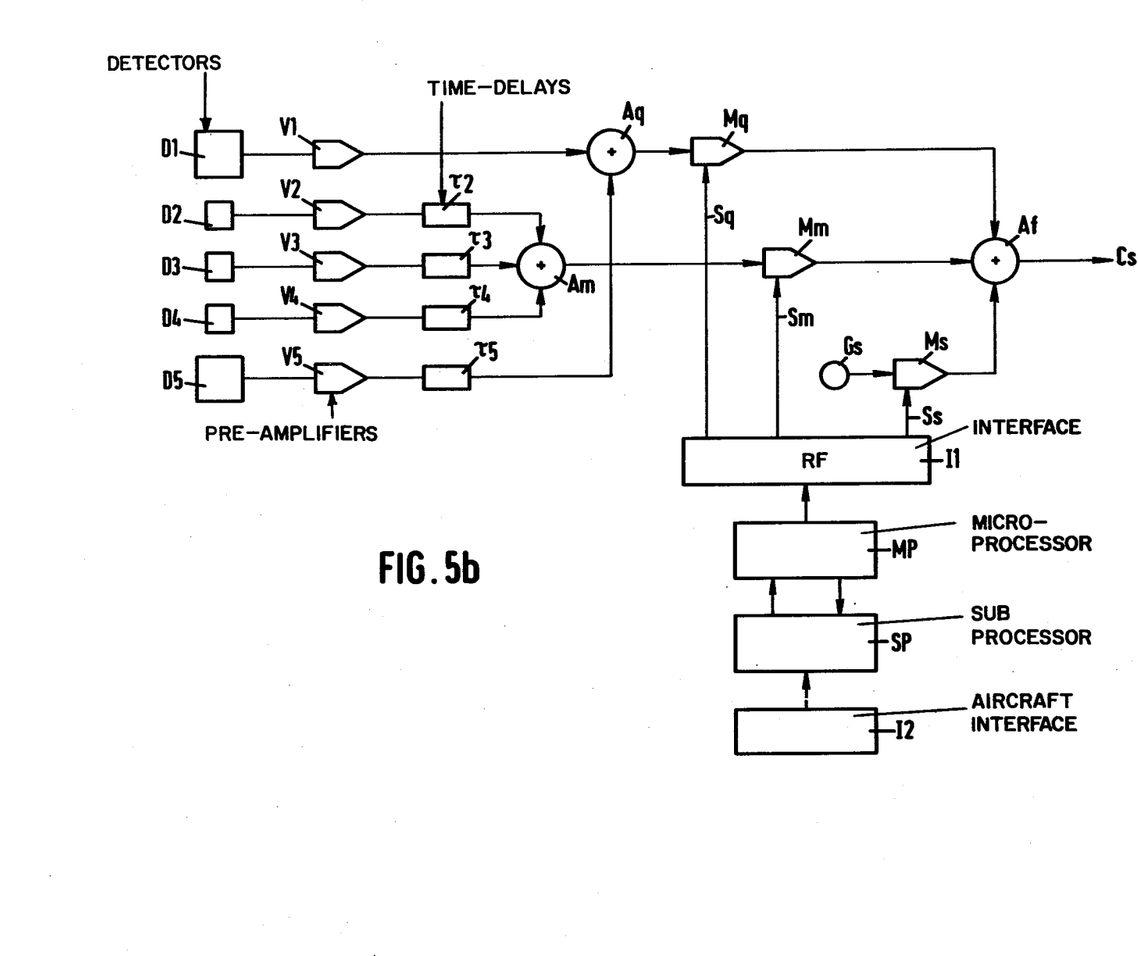

A preferred embodiment wherein for the implementation of the afore-mentioned principle a micro processor can be advantageously employed as the heart of the information processing arrangement for handling the video signals derived from the individual detector elements, is shown in FIG. 5b.

All signal processing functions are controlled by a main micro processor MP which is programmed to produce, among other things, control signals for selectively controlling the multiplying factors of multipliers Mm, Mq and Ms respectively for delivering a composite signal Cs to be applied to utilizing means (not shown) from which for instance a drive signal for the drive circuit AK in the embodiment of FIG. 5a, can be derived. As shown in FIG. 5b, the video signals derived from detector elements having small sensitive area, such as D2, D3 and D4, and from the detector elements having large sensitive area, such as D1 and D5, respectively, are after having been appropriately delayed by delay means τ2–τ5, added by individual adders Am and Aq respectively. The output of each one of the adders Am and Aq respectively is connected to an individual multiplier Mm and Mq respectively, which functions as an amplifier with controllable gain, so as to selectively vary the multiplication factor for the respective signal applied to its input. Each multiplier has its output connected to a further adder Af, which also receives a controllable DC-bias from a further multiplier Ms, which in response to a source signal from a source Gs functions as a controllable DC-source providing a DC-plateau signal for the composite signal Cs. Each of the multipliers Mm, Mq and Ms receives an individual control signal Sm, Sq and Ss respectively from an interface I1 which translates the individual, digital control signals from the main micro processor MP into corresponding signals suitable for the control of the corresponding multipliers. The main processor in its turn receives its instructions such as v/h related information and signal-to-noise ratio related information, from a sub-processor SP. The sub-processor is arranged to translate the relevant information derived from the aircraft interface I2, such as v/h and S/N, into instructions suitable for the main processor. By selecting an appropriate program, the main-processor can be made responsive to the input instructions from the sub-processor for generating control signals for controlling the multipliers Mm, Mq and Ms in a manner that the three component signals applied to the adder Af are added with v/h and/or S/N dependent weight factors.

It is to be understood that the invention is not limited to the specific embodiments described herein. Within the scope of the subject invention, various alternative embodiments can be designed by a person skilled in the art.

For instance, in the information processing arrangement it is not strictly necessary to individually delay video signals derived from the detector elements. In principle, each of the video signals from the detector elements can, without delayed, be processed through an individual controllable multiplier wherein each one of the multipliers is individually controlled from the main processor. Therefore, with n detector elements, there will be produced n separate video signals which are individually multiplied (weighted) and individually recorded on a common record medium.

I claim:

1. A radiation detecting system for a scanning system, comprising
 a linear array of detector elements being deposed serially in the path of a scanned beam of radiation,
 said linear array of detector elements including elements of different sizes for different sensitivity to the scanned beam of radiation,
 variable amplitude means coupled in an output of a first of the plurality of detector elements of one size,
 means for combining the output of the variable amplitude means with the output of a second of the plurality of detectors into a single output signal, and
 control means for controlling the variable amplitude means to change the amplitude of the output of the variable amplitude means relative to the output of the second element in accordance with changes in sensed operating conditions.

2. A system as claimed in claim 1 includng second variable amplitude means coupled in the output of the second of the plurality of detector elements, and the control means controls the second variable amplitude means to change the amplitude of the output of another element relative to the amplitude of the output of the first variable means.

3. A system as claimed in claim 2 wherein said detector elements include a plurality of elements of the one size, and there is included second means for combining the outputs of the plurality of elements of one size, the output of said second means being coupled to the input of the first variable amplitude means.

4. A system according to claim 2 wherein said variable amplitude means are potentiometers.

5. A system according to claim 2 wherein said variable amplitude means are variable amplifiers.

6. A system as claimed in claim 1 wherein the control means is responsive to a velocity-height ratio of an aircraft carrying a scanning system.

7. A system as claimed in claim 6 wherein the control means is responsive to a signal-to-noise ratio in the single output signal.

8. A system as claimed in claim 3 wherein the first element is larger than the second element, and the control means changes the output of the variable amplitude means in proportion to the change in velocity divided by height of the aircraft.

9. A system as claimed in claim 8 wherein the control means changes the output of the variable means inversely to the signal-to-noise ratio of the single output signal.

10. A system according to claim 1 wherein the control means includes a microprocessor.

11. A system as claimed in claim 1 wherein there are a plurality of said linear arrays.

* * * * *